United States Patent
Lai et al.

(10) Patent No.: US 7,269,985 B2
(45) Date of Patent: Sep. 18, 2007

(54) MAGNIFYING LENS COVER FOR COMBINATION PADLOCKS

(75) Inventors: Eric Lai, Hong Kong (HK); Karl Lai, Hong Kong (HK)

(73) Assignee: The Sun Lock Company Ltd., Hong Kong (HK)

( * ) Notice: Subject to any disclaimer, the term of this patent is extended or adjusted under 35 U.S.C. 154(b) by 0 days.

(21) Appl. No.: 11/312,814

(22) Filed: Dec. 20, 2005

(65) Prior Publication Data

US 2007/0137270 A1  Jun. 21, 2007

(51) Int. Cl.
*E05B 17/00* (2006.01)
(52) U.S. Cl. ............... 70/446; 70/21; 70/27; 70/332; 70/333 A
(58) Field of Classification Search ............... 70/21, 70/24, 27, 30, 51, 52, 56, 332, 333 A, 446
See application file for complete search history.

(56) References Cited

U.S. PATENT DOCUMENTS

| | | | | |
|---|---|---|---|---|
| 1,197,444 A | * | 9/1916 | Burnett | 70/446 |
| 1,267,894 A | * | 5/1918 | Olson | 70/30 |
| 1,435,992 A | * | 11/1922 | Strauss et al. | 70/442 |
| 1,652,897 A | * | 12/1927 | Hill | 70/333 A |
| 1,763,224 A | * | 6/1930 | Davis | 116/254 |
| 3,851,507 A | * | 12/1974 | Gehrie | 70/316 |
| 3,952,562 A | * | 4/1976 | Snow | 70/476 |
| 4,158,260 A | * | 6/1979 | Benger et al. | 33/272 |
| 4,197,726 A | * | 4/1980 | Uyeda | 70/332 |
| 4,287,734 A | * | 9/1981 | Herriott | 70/333 A |
| 5,359,867 A |   | 11/1994 | Ling et al. | 70/28 |
| 5,927,114 A | * | 7/1999 | Berry | 70/332 |
| 6,408,660 B1 | * | 6/2002 | Lai | 70/30 |
| 6,647,633 B2 | * | 11/2003 | Iden | 33/352 |
| 6,860,126 B2 |   | 3/2005 | Ling | 70/30 |

\* cited by examiner

*Primary Examiner*—Suzanne Dino Barrett
(74) *Attorney, Agent, or Firm*—Melvin I. Stoltz

(57) ABSTRACT

By providing a magnifying member which is securely affixed to the housing of a combination padlock in cooperating association with the rotating dials thereof, an easily produced, combination padlock is achieved which provides a display zone for the pre-set combination wherein the indicia formed on each of the dials is easily seen and readily visible for any user. By positioning the magnifying member in overlying, aligned relationship with the rotatable dials, the visibility of the indicia formed on each dial is greatly enhanced. As a result, any user is able to immediately determine and recognize the different indicia formed on each rotatable dial, and quickly position the combination of indicia which represent the preselected combination for releasing the shackle from locked engagement with the housing.

12 Claims, 2 Drawing Sheets

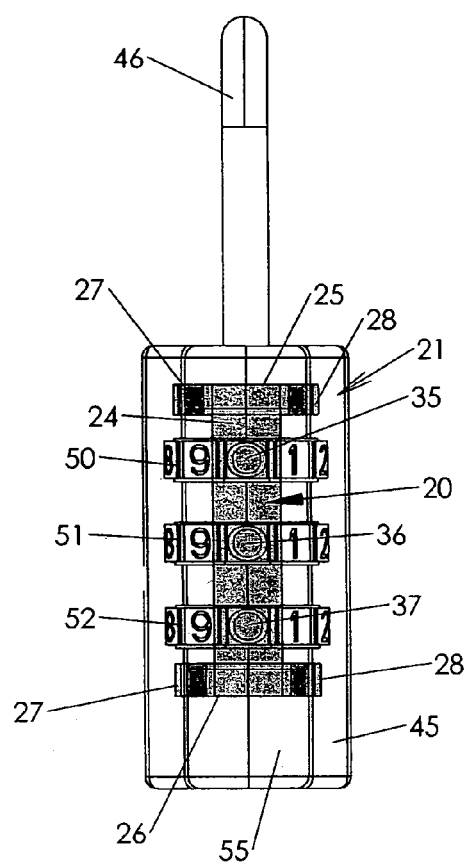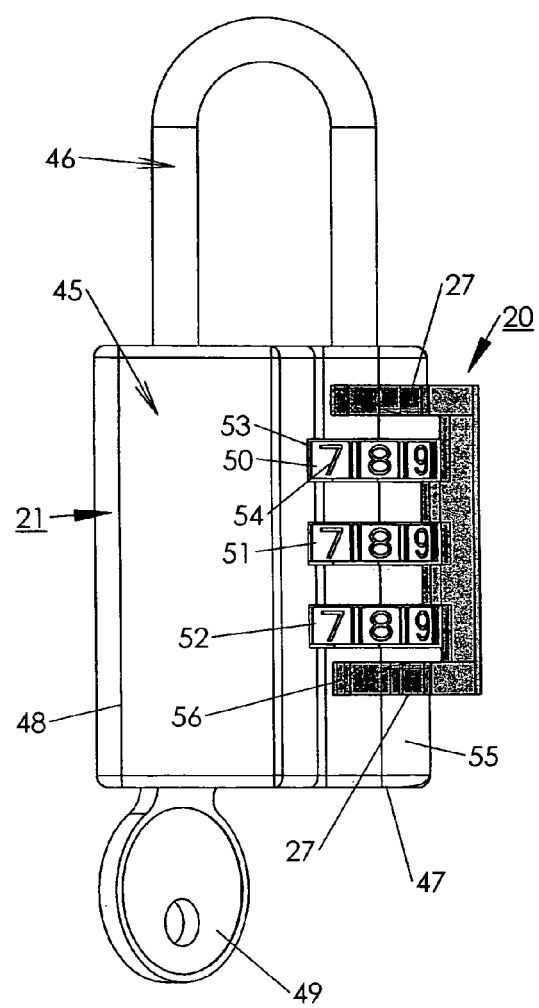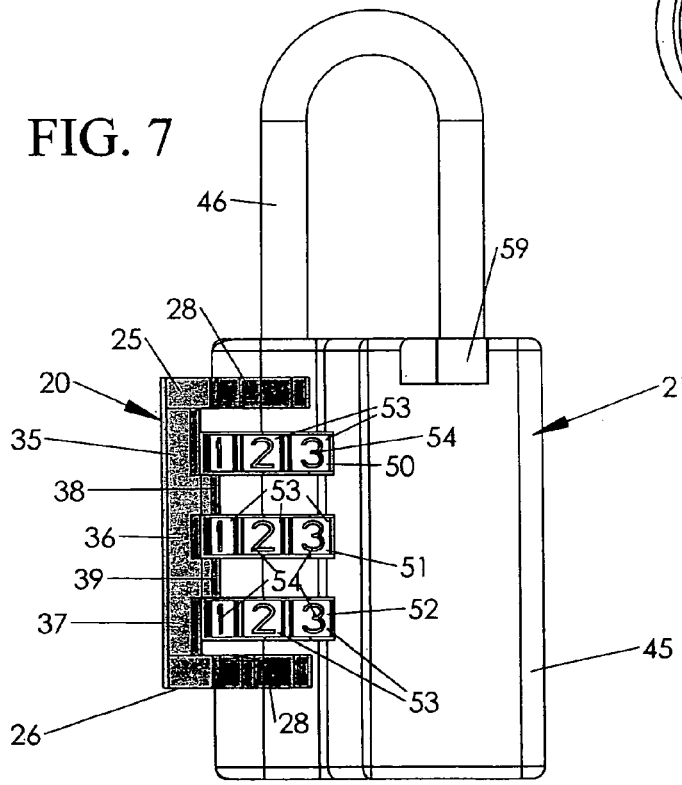

MAGNIFYING LENS COVER FOR COMBINATION PADLOCKS

TECHNICAL FIELD

This invention relates to padlocks and lock systems and, more particularly, to combination padlocks constructed for enabling the combination position identifiers to be easily seen by the user.

BACKGROUND ART

Numerous padlock constructions have been developed and are widely employed by individuals to prevent unauthorized persons from gaining access to any particular item or area which has been closed and locked. Although many locks are constructed to be opened by a key, numerous combination lock constructions have been developed which are opened by knowledge of a particular combination.

One particular type of combination lock that has become very popular due to its ease and convenience of use is a combination lock which employs a plurality of rotatable independent dials, each of which forms one of the indicia, usually numerals or letters, which comprise the combination for releasing the lock. Typically, the combination lock has one mode or position in which the user is able to set or reset the desired combination sequence. Although locks of this general nature have been available for several decades, these prior art combination lock constructions suffer from common deficiencies which have not been successfully overcome.

Although many manufacturers have attempted to solve the problems associated with rotatable dial or combination locks, one principal difficulty and drawback these prior art constructions have been unable to overcome is a construction which provides an easily seen visual display to the user when the desired combination is being entered. In such instances when the known combination is not easily seen and properly entered, the entire combination lock is incapable of being opened, since the user is unable to release the shackle from locked engagement with the housing.

In addition, although key operated locks do not suffer from the difficulty of having the combination changed or altered without the user's knowledge, users are frequently incapable of using key operated locks, due to the key being lost or misplaced. As a result, prior art key operated locks are also frequently discarded due to the user's inability to find a particular key for operating the lock.

Another common problem which has consistently plagued prior art constructions is the cost of construction for producing and assembling prior art padlocks, whether the padlock is key operated or combination operated. In order to attain a padlock which provides all of the features desired by consumers, prior art constructions typically incorporate numerous small components, each of which require expensive assembly procedures to produce the final product. As a result, these prior art lock constructions are expensive to produce, thereby reducing the ability of these locks to reach a broad base of consumers.

Another problem commonly found with prior art padlocks is the inability of these prior art constructions to prevent contaminants from reaching the rotatable, internal component of the lock, thereby causing damage to these components or interfering with the ease of operating the lock by an individual who either knows the actual combination or has the activating key. Although numerous attempts have been made to reduce the adverse effects caused by contaminants reaching these components, such attempts have been incapable of completely eliminating in this problem.

A final, still further difficulty, which has recently arisen and affects both combination locks and key operated locks, is a requirement that all secured locks must be broken by Customs officers, and/or inspection or security personnel in order to gain access to luggage which is deemed suspicious. Under new security regulations that is being implemented, all luggage must be scanned or inspected to prevent the transportation of potentially dangerous items or products which are deemed to be undesirable. In those instances when luggage is scanned and further visual inspection is required, the inspectors have the authority to open the luggage for visual inspection, including physically breaking any lock which may be on the luggage.

Consequently, with these new regulations presently implemented, all prior art lock systems which are incapable of being opened by inspectors and/or security personnel are subject to be physically broken, in order to gain access to any luggage which needs to be visually inspected. As a result, consumers will now be faced with the possibility that any lock system employed to protect the contents of a suitcase can be physically removed by security personnel, leaving the luggage completely unprotected during the remainder of the trip.

Therefore, it is a principal object of the present invention to provide a combination padlock construction which enables the indicia formed on the rotatable dials to be easily seen and be highly visible.

Another object of the present invention is to provide a combination lock construction having the characteristic features described above wherein the combination defining zone is prominently displayed in an easily seen and readily recognized position.

Another object of the present invention is to provide a combination padlock construction having the characteristic features described above which employs a minimum number of components and is quickly and easily assembled, thereby providing a combination lock capable of being constructed at competitive prices.

Another object of the present invention is to provide a combination lock construction having the characteristic features described above which effectively seals the rotating components from external contamination and effectively prevents any external contaminants from reaching the rotating components thereof.

Another object of the present invention is to provide a combination padlock construction having a characteristic features described above which also incorporates a key operated section for enabling all of the requirements of customs officers and/or inspection or security personnel to be met while also enabling the user to completely control the combination section of the lock independently of the key controlled section.

Other and more specific objects will in part be obvious and will in part appear hereinafter.

SUMMARY OF THE INVENTION

By employing the present invention all of the difficulties and drawbacks of the prior are are virtually eliminated and an effective, easily produced, combination padlock is achieved which provides a display zone for the pre-set combination wherein the indicia formed on each of the dials is easily seen and readily visible for any user. In this way, any user is able to immediately recognize each of the indicia formed on each rotatable dial and position the precise combination of preselected indicia in the designated zone for enabling the shackle to be released from locked engagement with the housing. In this way, any and all users are able to employ the combination padlock of the present invention with assurance that whenever the secured lock is to be opened and released, the pre-established combination will be easily and accurately inputted on the lock, enabling its release and allowing the user to gain access to the container or suitcase on which the lock had been secured.

In the preferred construction of the present invention, a single housing and shackle assembly are employed and constructed for enabling the shackle to be released from locked engagement with the housing using either a rotatable dial combination construction or a key-activated tumbler construction. In this way, a dual locking and releasing padlock is achieved which satisfies all of the new requirements for padlocks being used for travel wherein customs officers and/or security personnel are required to inspect the suitcase or other container.

In the preferred construction or the present invention, a generally conventional J-shaped shackle is employed with one portion of the housing cooperatively associated with the longer leg of the shackle. In addition, this portion of the housing is also constructed with rotatable, combination defining dials which control the axial movement of the longer leg of the shackle. In this way, the axial movement of the shackle in the housing is completely controlled by the rotatable, combination defining dials, enabling the locking and releasing of the shackle relative to the housing to be easily achieved by employing the known combination.

In addition, in accordance with the teaching of the present invention, a magnifying member is securely affixed to the housing in cooperating association with the rotating dials thereof. By positioning the magnifying member in overlying, aligned relationship with the rotatable dials, the visibility of the indicia formed on each dial is greatly enhanced. As a result, any user is able to immediately determine and recognize the different indicia formed on each rotatable dial, and quickly position the combination of indicia which represent the preselected combination for releasing the shackle from locked engagement with the housing.

Although the magnifying member of the present invention can be constructed in a wide variety of alternate configurations, without departing from the scope of the present invention, it has been found that a simple, easily constructed and easily secured magnifying member is able to achieve all of the desired results, without adding any substantial cost or assembly difficulties. In this regard, in the preferred construction, a single elongated strip of material is formed having an overall length slightly greater than the overall length of the rotatable dials mounted to the housing. In addition, in this preferred embodiment, the elongated strip of material comprises a width substantially equal to or slightly greater than the width of one indicia bearing panel. In this way, a minimum amount of material is required, while each of the panels of each rotatable dial is effectively magnified as the panel is rotated into the designated combination defining zone.

Although the entire strip of material forming the magnifying member of the present invention may be constructed in a manner which assures magnification of the elements positioned below the entire strip, the preferred embodiment of the present invention incorporates a plurality of separate and distinct magnification zones formed along the strip, with each of the magnification zones being constructed for being positioned in overlying, aligned relationship with the indicia of each of the rotatable dials. In this way, assurance is provided that each of the indicia formed on each rotatable dial is magnified as that indicia is placed in aligned relationship with the magnification zone. As a result, ease of readability of each indicia is realized in a cost effective and highly efficient construction.

In addition, in the preferred embodiment of the present invention, the magnifying member incorporates a plurality of locking fingers extending from the elongated strip of material, with the locking fingers being constructed for peripherally surrounding and lockingly engaging a portion of the housing forming the padlock. In this way, the magnifying member is quickly and easily securely affixed to the housing forming the padlock, with the magnifying member being placed in the precisely desired location. As a result, assembly ease is provided, as well as assurance that the magnifying member will be retained in the precisely desired position.

Although the construction detailed above represents the preferred embodiment of the present invention, alternate constructions can be employed without departing from the scope of this invention. In this regard, the magnifying member of the present invention can be mounted to the housing in aligned relationship with a plurality of the panels of the rotatable dials for enabling several adjacent panels to be simultaneously magnified for enhanced visibility. Furthermore, the magnifying member of the present invention can be permanently affixed to the housing, effectively becoming an integral component thereof. Although these alternate constructions and configurations, as well as numerous other alternate constructions and configurations can be implemented, these variations are intended to be included within the scope of the present invention.

The invention accordingly comprises an article of manufacture possessing the features, properties, and relation of elements which will be exemplified in the article hereinafter described, and the scope of the invention will be indiciated in the claims.

THE DRAWINGS

For a fuller understanding of the nature and objects of the invention, reference should be had to the following detailed description taken in connection with the accompanying drawings, in which:

FIG. 5 is a front elevation view depicting the preferred embodiment of the magnifying member of the present invention securely mounted to a padlock in cooperating relationship with the rotatable dials thereof;

FIG. 6 is a left side elevation view of the magnifying member and padlock of FIG. 5; and FIG. 7 is a right side elevation view of the magnifying member and padlock of FIG. 5.

DETAILED DESCRIPTION

Figure 1:
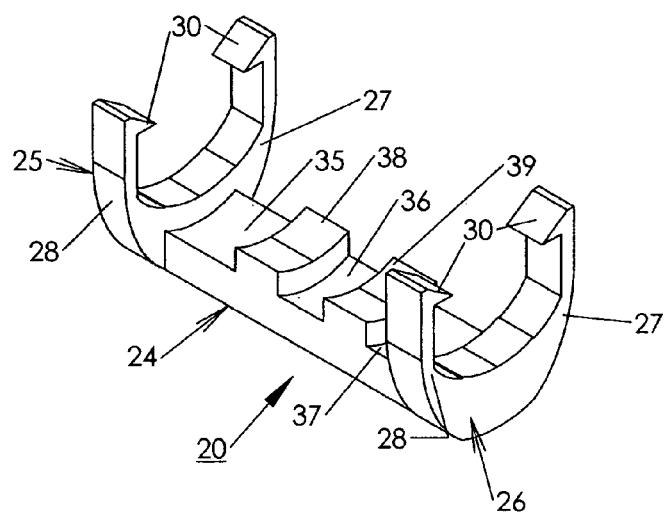
FIG. 1 is a rear perspective view of the preferred embodiment of a removable magnifying member made in accordance with the present invention.
Figure 2:
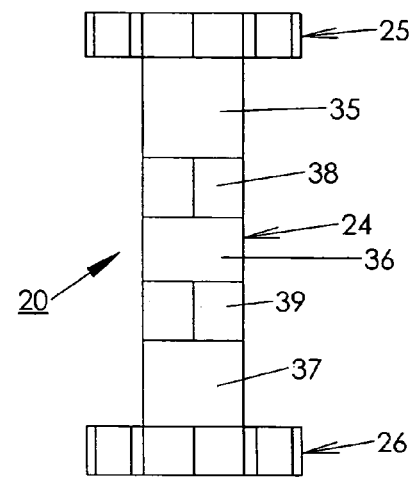
FIG. 2 is a rear elevation view of the magnifying member of FIG. 1.
Figure 3:
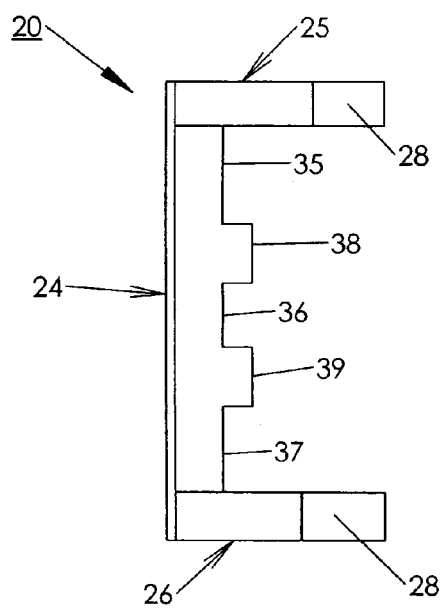
FIG. 3 is a side elevation view of the magnifying member of FIG. 2.
Figure 4:
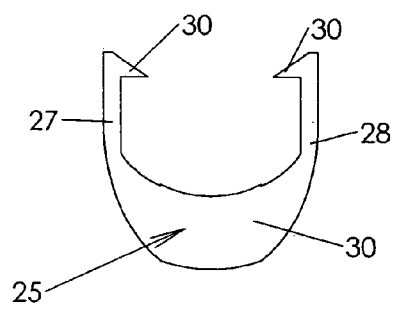
FIG. 4 is a top plan view of the magnifying member of FIG. 2.

By referring to FIGS. 1-7, along with the following detailed disclosure, the construction and operation of the preferred embodiment of the magnifying member of the present invention can best be understood. As will be evident from this disclosure, numerous alternate constructions and configurations of the magnifying member can be made without departing from the scope of the present invention. Consequently, it is to be understood that this disclosure is intended for exemplary purposes only, and is not intended as a limitation of the present invention.

In FIGS. 1-4 magnifying member 20 of the present invention is depicted in its-preferred embodiment as a removable component capable of being quickly and easily mounted to a desired padlock 21, as shown in FIGS. 5-7. As discussed above, if desired, magnifying member 20 may be constructed permanently attached to padlock 21, in order to form a single, fully integrated construction. However, in the preferred embodiment, magnifying member 20 is constructed as a removable component, which may be securely mounted to padlock 21 and, if desired, removed therefrom.

In this preferred construction, magnifying member 20 comprises elongated, central body portion 24 with upper clamping or clip portion 25 integrally affixed to one end of central body portion 24 while lower clamping or clip portion 26 is integrally affixed to the opposed end of central body portion 24. In addition, both upper clamping/clip portion 25 and lower clamping/clip portion 26 incorporate a generally U-shaped configuration which comprises arm members 27 and 28, which are interconnected by connecting portion 29. Furthermore, each arm member 27 and 28 incorporates inwardly extending finger section 30.

In completing the preferred construction of magnification member 20, central body portion 24 incorporates a plurality of magnification zones or panels. In accordance with the teaching of this invention, central body portion 24 incorporates a separate and independent magnification zone/panel for each rotating dial incorporated on the associated padlock. In the embodiment depicted herein, three rotatable dials are employed on padlock 21 and, as a result, central body portion 24 incorporates three magnification zones/panels 35, 36, and 37. In addition, as depicted, in the preferred embodiment, each magnification zone/panel is separated by an inwardly extending support wall, resulting in central body portion 24 incorporating support walls 38 and 39.

Each magnifying zone/panel 35, 36, and 37 is constructed using known forming technology to comprise a magnification lens element which enables the indicia formed on at least one panel of each of the rotating dials of padlock 21 to visually appear to the eye of the user as an enlarged virtual image. In this way, as is fully detailed below, by constructing magnification zones/panels 35, 36, and 37 of central body portion 24 to comprise the combination defining zone, the user is able to easily see and select the precise indicia which have been preselected to create the desired combination. As a result, the user is able to quickly and easily open padlock 20, whenever desired.

In order to obtain the desired magnification or virtual enlargement of the indicia formed on at least one panel of each of the rotating dials of padlock 20, it is important to position magnification zones/panels 35, 36, and 37 at a precisely spaced distance from the surface of the panel of the rotating dial being magnified. As is more fully detailed below, in order to achieve this result, support walls 38 and 39 are employed and are constructed for contacting the outer surface of padlock 21, establishing the required spacing between the surface of each panel of each rotatable dial and its associated magnification zone/panels 35, 36, or 37.

As shown in FIGS. 5-7, in the preferred embodiment of the present invention, magnifying member 20 is securely mounted to padlock 21 for providing the enhancements detailed herein. In this preferred construction, padlock 21 comprises a dual locking mode padlock incorporating housing 45 and J-shaped shackle 46, with shackle 46 being lockingly engageable and disengageable with housing 45 in order to achieve the desired operation. In addition, in this preferred construction, housing 45 incorporates a combination controlled locking section 47 formed on one side thereof and a key controlled locking section 48 formed on the opposed side thereof. Regardless of the section used by an individual to lock and unlock padlock 21, the cooperative engagement of shackle 46 with housing 45 is employed.

In the preferred operation, the long leg of J-shaped shackle 46 is cooperatively associated with combination controlled locking section 47 for being axially movable in response to the position of the rotatable dials forming a part of combination controlled locking section 47. Once the preselected combination has been entered on the rotatable dials, shackle 46 is able to be axially moved relative to housing 45, thereby releasing the short leg from engagement with housing 45.

In addition, the short leg of J-shaped shackle 46 is able to be released from locked engagement with housing 45 by employing key controlled locking section 48. In this regard, by inserting an appropriate key 49 into the associated locking cylinders contained in key controlled locking section 48 and pivoting key 49 in the locking cylinders, locking wall 59 of padlock 21 is removed from blocking relationship with the short leg of shackle 46, enabling shackle 46 to arcuately pivot about the central axis of the long leg, effectively releasing shackle 46 from locked engagement with housing 45.

In order to more fully understand the construction and operation of dual locking mode padlock 21, reference should be made to U.S. Patent Application Publication No. 2005/0092036,the relevant portions of which are hereby incorporated by reference. However, the disclosure contained herein details the construction of the relevant portions of padlock 21 which are required for achieving the goals and objectives of the present invention.

In order to enable combination controlled locking section 47 of padlock 21 to operate in the desired manner, padlock 21 incorporates a plurality of circular shaped rotatable dials. In the embodiment depicted, three separate independent rotatable dials are employed, depicted as dials 50, 51, and 52. In addition, each rotatable dial 50, 51, and 52 comprises a plurality of panels 53 formed thereon, with each panel 53 incorporating indicia 54 formed therein. In the preferred construction, one of the indicia 54 of each rotatable dial 50, 51, and 52 is selected by the user to represent one component of the combination for releasing shackle 46 from locked engagement with housing 45. Once one desired indicia 54 is selected from each rotatable dial 50, 51 and 52, a unique user determined combination is established and is employed for releasing shackle 46 whenever desired.

Although any desired indicia 54 can be employed and formed in panels 53, numerals or letters are typically employed in most constructions. In the present invention, each rotatable dial 50, 51, and 52 comprises an outer surface on which ten panels 53 are formed, with one numeral ranging from 0, 1, 2, 3, 4, 5, 6, 7, 8,and 9 being formed on each panel 53. By selecting one numeral from each panel 53 of each dial 50, 51, and 52, the desired unique combination for padlock 21 is achieved.

As clearly depicted in FIGS. 5-7, magnifying member 20 is securely affixed to padlock 21 in cooperating relationship with rotatable dials 50, 51, and 52. In this regard, arm members 27 and 28 of upper clamp/clip portion 25 and lower clamp/clip portion 26 are positioned in peripheral, surrounding engagement with the outside surface of forward section 55 of housing 45 of padlock 21. In addition, when placed in the desired position, central body portion 24 of magnifying member 20 is vertically aligned in overlying relationship with rotatable dials 50, 51, and 52. Furthermore, magnification zone/panel 35 is placed in overlying aligned relationship with rotatable dial 50, while magnification zone/panel 36 is in overlying aligned relationship with rotatable dial 51, while magnification zone/panel 37 is in overlying, aligned relationship with rotatable dial 52.

In order to assure that magnification member 20 is securely affixed in locked interengagement with housing 45 of padlock 21 in the precisely desired position, housing 45 of padlock 21 incorporates cavities 56 formed in the outer surface thereof, in position for cooperating engagement with finger sections 30 of arm members 27 and 28. For exemplary purposes, FIG. 6 clearly depicts cavity 56 formed in housing 45 in the desired position. By incorporating the plurality of cavities 56 in housing 45 in the desired position for interengagement with finger sections 30 of arm members 27 and 28, the desired secure, locked engagement of magnifying member 20 with padlock 21 is assured.

Furthermore, by constructing forward section 55 of housing 45 with an overall width which is slightly greater than the normal, relaxed, spaced distance between arm members 27 and 28, arm members 27 and 28 are forced apart relative to each other in order to surround forward section 55. As a result, assurance is provided that finger sections 30 are maintained in secure, biased, locked interengagement in cavities 56, and magnifying member 20 is mounted to padlock 20 in affixed interengagement therewith.

In addition, magnification zones/panels 35, 36 and 37 are maintained in the precisely desired spaced distance from rotatable dials 50, 51, and 52 due to the incorporation of support walls 38 and 39. As best seen in FIGS. 6 and 7, support walls 38 and 39 are placed in contact with the outer surface of housing 45 of padlock 21, directly between rotatable dials 35, 36, and 37. In this way, magnification zone/panels 35, 36, and 31 are positioned in the precisely desired location for assuring that the desired magnification of indicia 54 of each panel 53 of each rotatable dial 50, 51, and 52 is attained as each indicia is placed in cooperating alignment with magnification zone/panels 35, 36, and 37.

As clearly depicted in FIG. 5, indicia 54 of rotatable dial 50 is positioned in alignment with magnification zone 35 of central body portion 24 of magnifying member 20. Once in this position, indicia 54, depicted as the numeral "0", is magnified or virtually enlarged by the operation of the lens construction formed as an integral component of magnification zone/panel 35. As a result, indicia 54 is able to be viewed by any observer or user as a substantially enlarged numeral, thereby enabling indicia 54 to be easily seen and understood.

Similarly, indicia 54 of rotatable dial 51 is positioned in alignment with magnification zone 36, while indicia 54 of rotatable dial 52 is positioned in alignment with magnification zone 37. In each of these instances, each indicia 54 appears to the user as a substantially enlarged numeral, enabling each indicia 54 to be easily seen and understood. As a result, the user of padlock 21 is able to rotate dials 50, 51, and 52 relative to magnifying member 20 and quickly and easily see a substantially enlarged image of each indicia 54 as indicia 54 of each rotatable dial is placed in the combination designating zone. In this way, each of the preselected indicia forming the desired combination is quickly and easily identified and placed in the required combination designating zone for enabling padlock 20 to be opened whenever desired, without any difficulty and without any entry errors.

It will thus be seen that the object set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A magnifying member constructed for cooperating engagement with a combination padlock which incorporates a plurality of rotatable dials having indicia formed thereon, said magnifying member comprising:

A. a central body incorporating
      a) plurality of separate and independent magnifying zones, each of said zones being constructed for cooperating overlying alignment with one rotatable dial of the combination padlock for producing an enlarged virtual image of the indicia formed on the dial, and
      b a support wall formed between each pair of adjacent magnifying zones, with each support wall being constructed for contacting the outer surface of the padlock and positioning each magnifying zone in a desired location for producing the optimum enlarged virtual image; and
   B. fastening means affixed to the central body and constructed for mounted interengagement with the combination padlock for effectively affixing the central body to the padlock with the magnifying zone in overlying, aligned, cooperating relationship with the dial being magnified.

2. The magnifying member defined in claim 1, wherein said fastening means is defined as comprising a plurality of arm members extending from the central body and positioned for holding interengagement with the outer surface of the padlock.

3. The magnifying member defined in claim 2, wherein said combination padlock is further defined as comprising a housing which retains a plurality of rotatable dials, and the arm members extending from the body portion of the magnifying member are further defined as being constructed for removably locking interengagement with the surface of the housing.

4. The magnifying member defined in claim 3, wherein the housing of the combination padlock is further defined as comprising a plurality of cavities formed in the outer surface thereof and each arm member extending from the central body of the magnifying member is further defined as incorporating a finger portion extending therefrom and positioned for locked interengagement with one cavity of the housing.

5. An indicia magnifying combination padlock incorporating a plurality of indicia bearing rotatable dials with said padlock being constructed for enabling at least one indicia formed on each of said rotatable dials to be visually enlarged for improved visibility and readability, said combination padlock comprising:

A. a housing incorporating a movable shackle cooperatively associated therewith and a plurality of rotatable dials mounted in said housing and constructed for enabling the shackle to be movable between a locked position and an unlocked position, said unlocked position being attainable whenever one preselected indicia from each of the rotatable dials is positioned in a pre-determined aligned combination defining location;

B. a magnifying member mounted to the housing in cooperating, overlying alignment with the rotatable dials and comprising a central body incorporating a) a plurality of magnifying zones, each constructed for cooperating, overlying alignment with at least one indicia of each rotatable dial for producing an enlarged virtual image of the indicia formed on the dial, and b) a support wall formed between each pair of adjacent magnifying zones, with each of said support walls being constructed for contacting the outer surface of the housing and positioning each magnifying zone in a precisely desired location for providing the optimum enlarged virtual image of the indicia aligned therewith, and C. securement means cooperatively associated with the magnifying member for securely affixing the magnifying member to the housing of the combination padlock in the precisely desired position for providing improved and enhanced visual enlargement of each indicia of each rotatable dial associated therewith.

6. The magnifying member defined in claim 5, wherein the central body portion is further defined as comprising an overall width substantially equivalent to at least one panel of the rotatable dials and an overall length extending at least the overall length of the adjacent rotatable dials as positioned on the combination padlock, thereby enabling the indicia formed on at least one panel of each rotatable dial to be visually enlarged for improved readability.

7. The magnifying member defined in claim 6, wherein said central body portion when mounted to the combination padlock is positioned along the predetermined combination defining zone of the padlock.

8. The indicia magnifying combination padlock defined in claim 5 wherein the securement means cooperatively associated with the magnifying member is further defined as comprising a plurality of arm members extending from the central body thereof and positioned for contacting, secure mounted engagement with the housing of the padlock.

9. The indicia magnifying combination padlock defined in claim 8, wherein each of the plurality of arm members forming the securement means is further defined as comprising at least one finger member extending therefrom and constructed for engaging with receiving zones formed on the housing of the padlock.

10. The indicia magnifying combination padlock defined in claim 9, wherein said housing of the padlock is further defined as incorporating a plurality of finger receiving cavities formed therein and positioned for cooperative receipt and locked interengagement with the finger members of the arm members of the securement means, thereby assuring the desired securely mounted affixed interengagement of the magnifying member with the housing.

11. The indicia magnifying combination padlock defined in claim 10, wherein said magnifying member is removably mounted to the housing of the padlock for enabling the magnifying member to be removed in its entirety or mounted thereto, whenever desired by the user.

12. The indicia magnifying combination padlock defined in claim 5, wherein the plurality of magnifying zones are positioned along the combination defining location of the padlock, thereby enabling the indicia forming the predetermined combination to be easily seen by the user.

* * * * *